United States Patent [19]

Tanaka et al.

[11] Patent Number: 4,872,162

[45] Date of Patent: Oct. 3, 1989

[54] COMMUNICATION SYSTEM

[75] Inventors: Shotaro Tanaka; Masao Ikezaki, both of Osaka; Yukiko Ono; Hiroshi Sasanuma, both of Kyoto, all of Japan

[73] Assignee: Matsushita Electric Industrial Co., Ltd., Japan

[21] Appl. No.: 220,725

[22] Filed: Jul. 18, 1988

[30] Foreign Application Priority Data

Jul. 20, 1987 [JP] Japan .................................. 62-180420
Nov. 9, 1987 [JP] Japan .................................. 62-282474
Nov. 10, 1987 [JP] Japan .................................. 62-283580

[51] Int. Cl.$^4$ ............................................... H04J 3/26
[52] U.S. Cl. .................................. 370/85.12; 370/94.1
[58] Field of Search ............................. 370/85, 88, 94; 340/825.03, 825.02, 825.52, 825.53

[56] References Cited

U.S. PATENT DOCUMENTS

3,731,002  5/1973  Pierce ..................................... 370/88
4,763,104  8/1988  Inoue et al. ..................... 340/825.03
4,769,814  9/1988  Bederman et al. ..................... 370/88

Primary Examiner—Douglas W. Olms
Assistant Examiner—Melvin Marcelo
Attorney, Agent, or Firm—Lowe, Price, LeBlanc, Becker & Shur

[57] ABSTRACT

Messages are transmitted via a gateway between terminal equipments in different communication networks. The message includes a source address, a destination address, a first header information set, at least one data block, and an end code. The source address corresponds to the terminal equipment or the gateway from which the message is transmitted. The destination address corresponds to the terminal equipment or the gateway to which the message is directed. The first header information set has routing information related to the terminal equipments between which the messages are transmitted. The data block includes a second header information set and a command. The second header information set has routing information related to sections of the terminal equipments between which the messages are transmitted. The command is given to the section of the terminal equipment to which the message is directed.

7 Claims, 11 Drawing Sheets

COMMUNICATION SYSTEM

BACKGROUND OF THE INVENTION

This invention relates to a system for data communication between different communication networks.

Data communication between different communication networks is performed via a gateway connecting the communication networks. The gateway generally serves to convert and transfer communication messages.

SUMMARY OF THE INVENTION

It is an object of this invention to provide a simple communication system.

A communication system of this invention includes a gateway and at least two terminal equipments residing in different communication networks respectively and mutually connected via the gateway. One of the terminal equipments transmits a first communication message to the gateway and the gateway generates a second communication message on the basis of the first communication message and transmits the second communication message to the other of the terminal equipments. Each of the terminal equipments has sections. Different addresses are allotted to the gateway, the terminal equipments, and the sections of the terminal equipments respectively. Each of the first and second communication messages comprises a source address, a destination address, a first header information set, at least one data block, and an end code. The source address corresponds to one of the gateway and the terminal equipments from which the related message is transmitted. The destination address corresponds to one of the gateway and the terminal equipments to which the related message is directed. The first header information set follows the source address and the destination address. The data block follows the first header information set. The end code follows the data block. The end code represents an end of the first header information set. The first header information set comprises a head code, routing information, and presence/absence information. The presence/absence information follows the head code and precedes the routing information. The head code represents a head of the first header information set. The routing information relates to addresses of the terminal equipments to and from which the messages are directed and transmitted. The presence/absence information represents that the routing information is present or absent. The data block comprises a second header information set, a command, and a second end code. The command is given to one of the sections of the terminal equipment to which the message is directed. The second end code represents an end of the data block. The second header information set comprises a second head code, second routing information, second presence/absence information, and command information. The second presence/absence information and the command information follow the second head code and precede the second routing information. The second head code represents a head of the second header information set. The second routing information relates to addresses of sections of the terminal equipments to and from which the messages are directed and transmitted. The second presence/absence information represents that the second routing information is present or absent. The command information represents a type of the command.

In the case where two or more data blocks are present, one data block may be interposed in another data block in a nesting arrangement.

The data block may have a count code representing the number of data bytes in the data block. In this case, the end code is omitted from the data block.

DESCRIPTION OF THE FIRST PREFERRED EMBODIMENT

Figure 1:
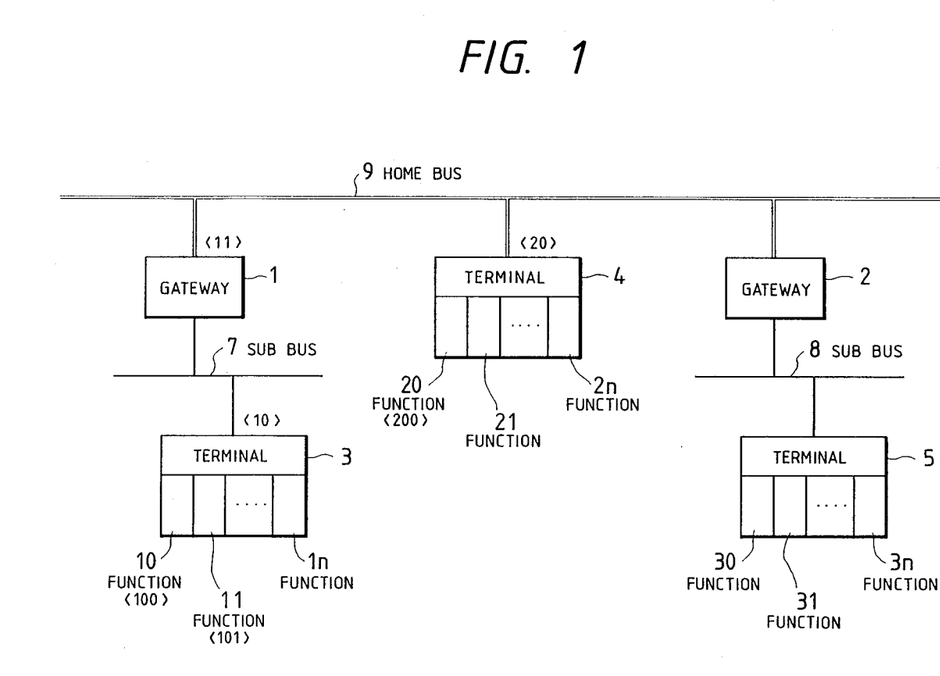
FIG. 1 is a diagram of a communication system according to a first embodiment of this invention.

With reference to FIG. 1, a communication system includes a gateway 1 connecting a home bus 9 and a sub bus 7. Another sub bus 8 is connected to the home bus 9 via a gateway 2. Terminal equipments, only one of which is shown, are mutually connected via the home bus 9, forming a home bus communication network. Terminal equipments, only one of which is shown, are mutually connected via the sub bus 7, forming a sub bus communication network. Similarly, terminal equipments, only one of which is shown, are mutually connected via the sub bus 8, forming another sub bus communication network. Terminal equipments 3, 4, and 5 are connected to the sub bus 7, the home bus 9, and the sub bus 8 respectively. The gateway 1 allows data communication between the terminal equipments 3 and 4 which are connected to the different buses 7 and 9 respectively. Similarly, the gateway 2 allows data communication between the terminal equipments 4 and 5 which are connected to the different buses 9 and 8 respectively.

The terminal equipment 3 includes a plurality of control command processing function means or control command processing sections 10, 11, ..., 1n. For example, in the case where the terminal equipment 3 is composed of a video cassette recording and reproducing apparatus, the respective function means 10, 11, ..., 1n correspond to a deck player section, a video tuner section, a timer section, and others. Similarly, the terminal equipment 4 includes a plurality of control command processing function means or sections 20, 21, ..., 2n. The terminal equipment 5 includes a plurality of control command processing function means or sections 30, 31, ..., 3n.

Preset different addresses are assigned to the respective devices 1-5 to uniquely identify the devices 1-5. Specifically, addresses <11>, <10>, and <20> are given to the devices 1, 3, and 4 respectively. Similarly, preset different addresses are assigned to the respective function means of each of the terminal equipments 3, 4, and 5. Specifically, addresses <100>, <101>, ..., <10n> are given to the function means 10, 11, ..., 1n of the terminal equipment 3 respectively. Addresses <200>, <201>, ..., <20n> are given to the function means 20, 21, ..., 2n of the terminal equipment 4 respectively.

The terminal equipments 3-5 include respective communication units outputting and receiving signals, representing communication messages, to and from the related buses.

Figure 2:
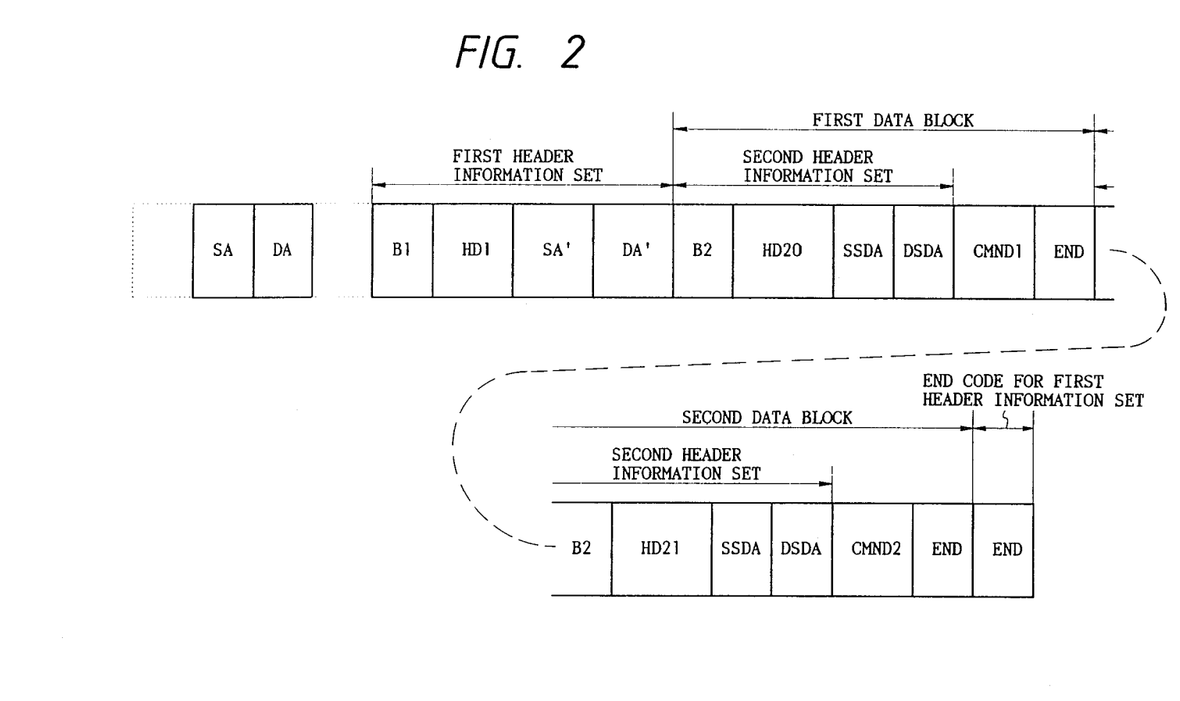
FIG. 2 is a diagram of a format of a message used in the communication system of FIG. 1.

As shown in FIG. 2, a communication message or frame includes a source address SA, a destination address DA, and a series of a first header information set, a first data block, a second data block, and a given end code for the first header information set. The codes SA and DA precedes the series of the information set, the data blocks, and the end code. The end code for the first header information set is placed at an end of the communication message. The code SA represents an address of an equipment or device from which a message is transmitted. The code DA represents an address of an equipment or device to which a message is directed.

The first header information set has a series of portions B1, HD1, SA', and DA'. The first portion B1 consists of a given code representing a head or start of the first header information set. The second portion HD1 consists of a header information code. The third portion SA' and the fourth portion DA' represent routing information. Specifically, the third portion SA' consists of a code corresponding to a source sub address, that is, an address of a device from which a message is transmitted. The fourth portion DA' consists of a code corresponding to a destination sub address, that is, an address of a device to which a message is directed. The header information code HD1 represents whether the sub addresses SA' and DA' are present or absent.

The first data block has a series of portions B2, HD20, SSDA, DSDA, CMND1, and END. The first portion B2 consists of a given code representing a head or start of the first data block. The second portion HD20 consists of a header information code. The third portion SSDA and the fourth portion DSDA represent routing information. Specifically, the third portion SSDA consists of a code corresponding to a source function means address, that is, an address of a terminal equipment function means from which a message is transmitted. The fourth portion DSDA consists of a code corresponding to a destination function means address, that is, an address of a terminal equipment function means to which a message is directed. The fifth portion CMND1 consists of a code corresponding to a command given to a terminal equipment or a function means. The header information code HD20 represents whether the function means addresses SSDA and DSDA are present or absent. The header information code HD20 also represents a type of the command CMND1. The sixth portion END consists of a given code representing an end of the first data block. The initial and intermediate portions B2, HD20, SSDA, and DSDA form a second header information set.

The second data block has a series of portions B2, HD21, SSDA, DSDA, CMND2, and END. The first portion B2 consists of a given code representing a head or start of the second data block. The second portion HD21 consists of a header information code. The third portion SSDA consists of a code corresponding to a source function means address, that is, an address of a terminal equipment function means from which a message is transmitted. The fourth portion DSDA consists of a code corresponding to a destination function means address, that is, an address of a terminal equipment function means to which a message is directed. The fifth portion CMND2 consists of a code corresponding to a command given to a terminal equipment or a function means. The header information code HD21 represents whether the function means addresses SSDA and DSDA are present or absent. The header information code HD21 also represents a type of the command CMND2. The sixth portion END consists of a given code representing an end of the second data block. The initial and intermediate portions B2, HD21, SSDA, and DSDA form a second header information set. The end code END of the second data block is followed by the end code END for the first header information set.

Figure 3:
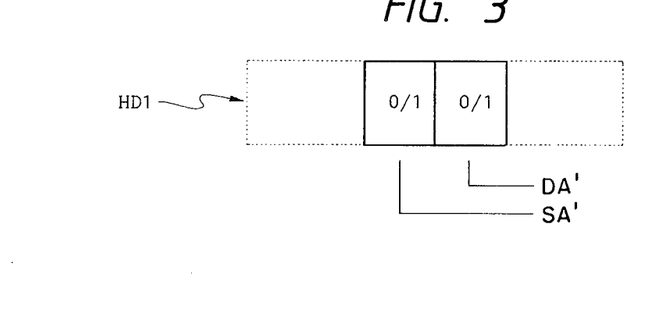
FIG. 3 is a diagram of a portion of the message of FIG. 2.

As shown in FIG. 3, the header information code HD1 includes a pair of serial bits. In the bit pair, the first bit equal to "0" and "1" represents that the source sub address SA' is present and absent respectively, and the second bit equal to "0" and "1" represents that the destination sub address DA' is present and absent respectively.

Figure 4:
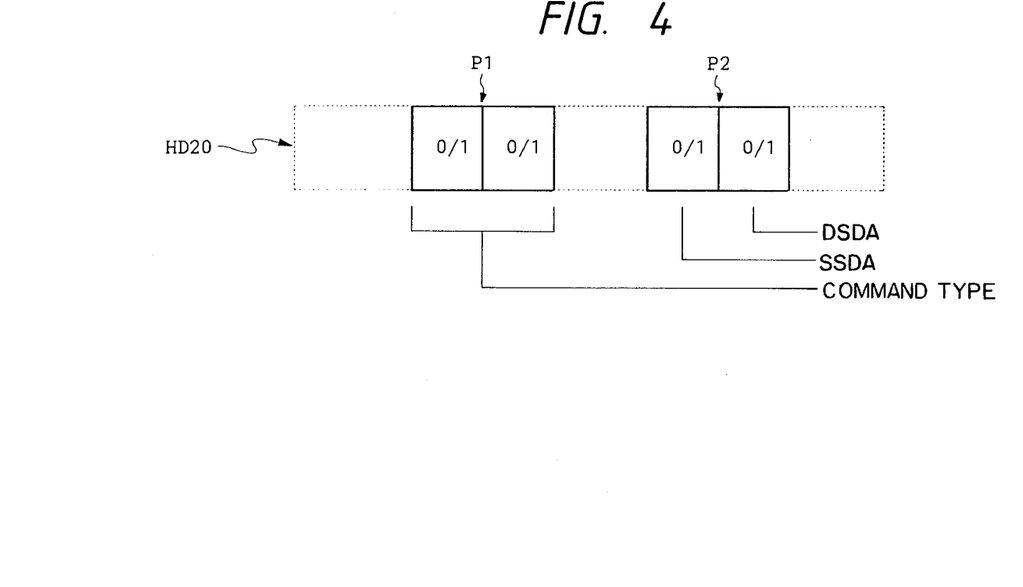
FIG. 4 is a diagram of another portion of the message of FIG. 2.

As shown in FIG. 4, the header information code HD20 in the first data block includes two pairs P1 and P2 of serial bits. The first pair P1 represents a type of the command CMND1. The second pair P2 represents whether the function means addresses SSDA and DSDA are present or absent. Specifically, in the second pair P2, the first bit equal to "0" and "1" represents that the source function means address SSDA is present and absent respectively, and the second bit equal to "0" and "1" represents that the destination function means address DSDA is present and absent respectively.

The header information code HD21 in the second data block is similar to the header information code HD20 in the first data block.

Figure 5:
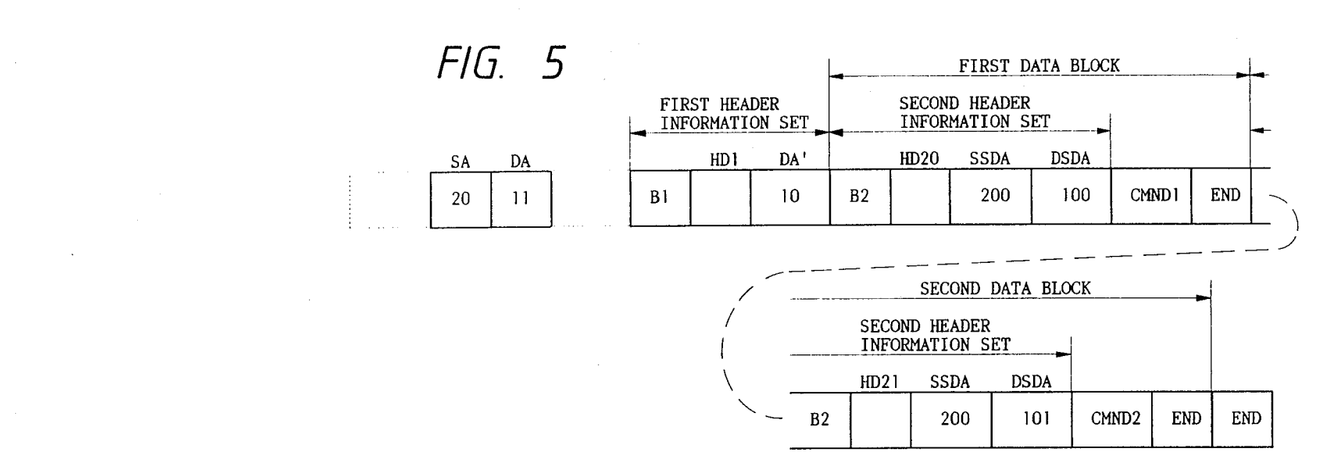
FIG. 5 is a diagram of one example of a message used in the communication system of FIG. 1.
Figure 6:
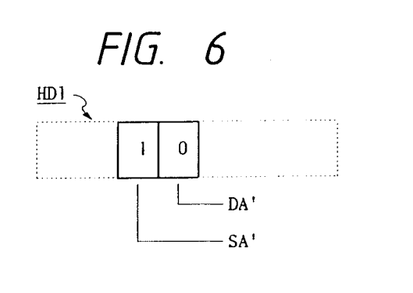
FIG. 6 is a diagram of a portion of the message of FIG. 5.
Figure 7:
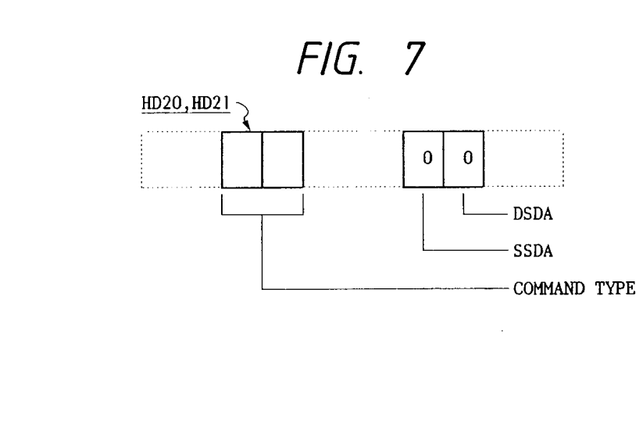
FIG. 7 is a diagram of another portion of the message of FIG. 5.

When two different commands CMND1 and CMND2 are transmitted from the function means 20 of the terminal equipment 4 to the function means 10 and 11 of the terminal equipment 3 respectively, the communication system operates as follows. The commands CMND1 and CMND2 are transmitted via the home bus 9, the gateway 1, and the sub bus 7. The communication unit of the terminal equipment 4 outputs a first message to the home bus 9. FIGS. 5-7 show internal conditions of the first message.

As shown in FIG. 5, in the first massage, the source address SA is <20> and the destination address DA is <11> since the first message is directed from the terminal equipment 4 to the gateway 1 via the home bus 9.

The code SA' represents an address of an equipment or device directly connected to the sub bus 7 and outputting a message. In this case, the first message is outputted from the terminal equipment 4 which is out of direct connection with the sub bus 7, so that the source sub address SA' is absent. Accordingly, as shown in FIG. 6, the first bit of the bit pair in the header information code HD1 is "1".

The first message is received by the gateway 1 from the home bus 9 since the destination address DA corresponds to the gateway 1. After the gateway 1 detects the given code B1, the gateway 1 detects and processes the subsequent header information code HD1 and the destination sub address DA'. The gateway 1 is informed by the header information code HD1 that the source sub address SA' is absent. The gateway 1 passes the remaining portion of the first message, that is, the portion of the first message from the code B2 to the message end END, to the sub bus 7 without processing that portion.

Figure 8:
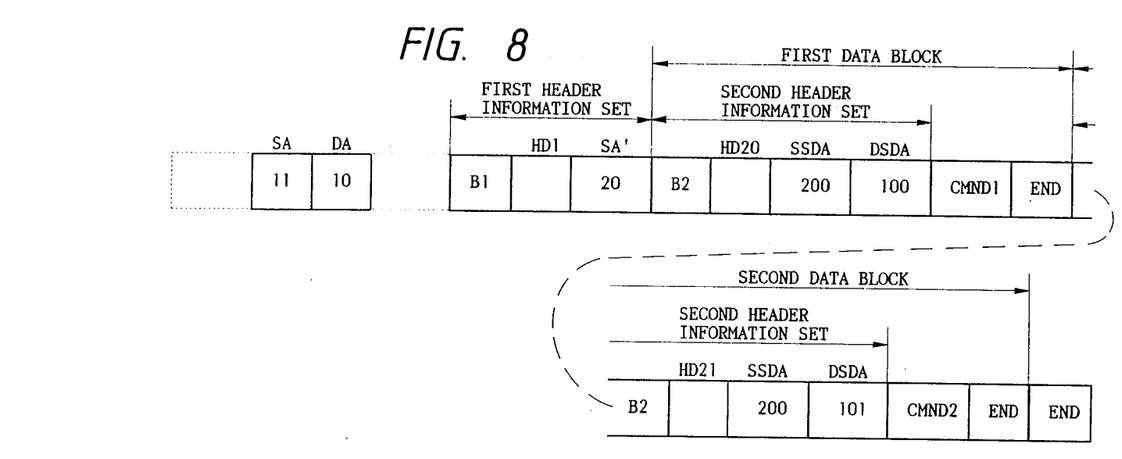
FIG. 8 is a diagram of one example of another message used in the communication system of FIG. 1.
Figure 9:
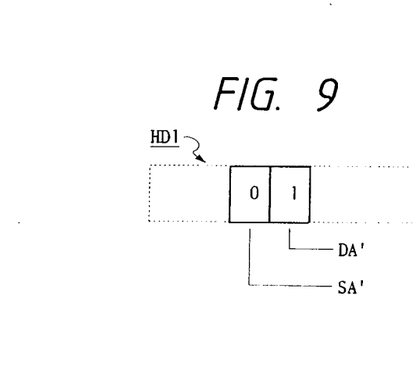
FIG. 9 is a diagram of a portion of the message of FIG. 8.
Figure 10:
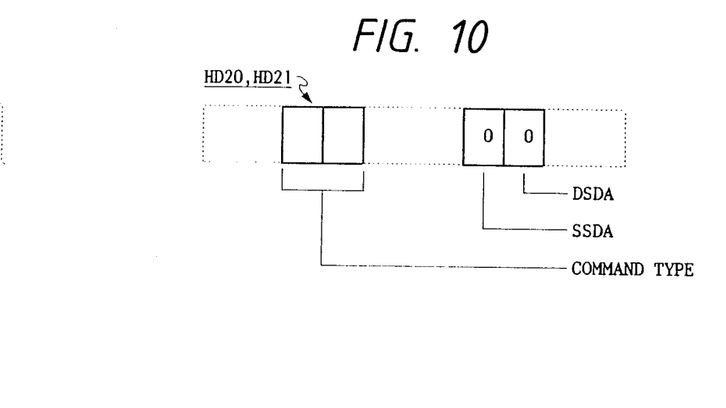
FIG. 10 is a diagram of another portion of the message of FIG 8.

The gateway 1 produces a second message on the basis of the first message and outputs the second message to the sub bus 7. FIGS. 8-10 show internal conditions of the second message. Since the second message is directed from the gateway 1 to the terminal equipment 3, the gateway 1 converts the source address SA from <20> to <11> and also converts the destination address DA from <11> to <10>. The code DA' in the second message represents an address of an equipment or device directly connected to the home bus 9 and receiving a message. Accordingly, the gateway 1 deletes the destination sub address DA'. In addition, the gateway 1 adds the source sub address SA'.

As understood from the previous description, it is unnecessary for the gateway 1 to process the portion of the first message between the code B2 to the message end END, so that the structure of the gateway 1 and the process in the gateway 1 can be simple.

The second message is received by the communication unit f the terminal equipment 3 from the sub bus 7 since the destination address DA corresponds to the terminal equipment 3. The terminal equipment 3 is informed, by the first of the codes B1, of a head of the second header information set. The terminal equipment 3 picks up the related command CMND1. During this command picking-up process, the terminal equipment 3 removes the function means addresses SSDA and DSDA in accordance with the contents of the header information code HD20, and thereby selects the data between the second header information set end and the first data block end. The terminal equipment 3 supplies the command CMND1 to the function means 10 which corresponds to the destination function means address DSDA. Similarly, the terminal equipment 3 is informed, by the second of the codes B1, of a head of the second header information set. The terminal equipment 3 picks up the related command CMND2. During this command picking-up process, the terminal equipment 3 removes the function means addresses SSDA and DSDA in accordance with the contents of the header information code HD21, and thereby selects the data between the second header information set end and the first data block end. The terminal equipment 3 supplies the command CMND2 to the function means 11 which corresponds to the destination function means address DSDA.

It should be noted that the number of data blocks may be different from two.

The gateway 1 will be described in more detail hereinafter. The gateway 1 includes a microcomputer having a combination of an input port, an output port, a central processing unit (CPU), a read-only memory (ROM), and a random-access memory (RAM).

Figure 11:
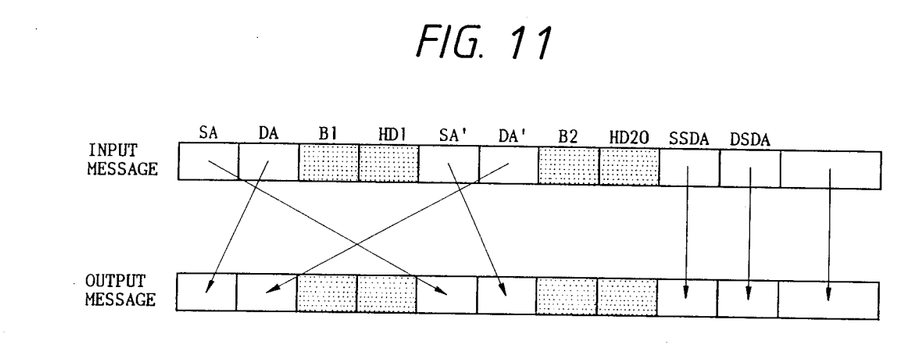
FIG. 11 is a diagram showing the relationship between an input message and an output message into and from the gateway of FIG. 1.

As shown in FIG. 11, an output message from the gateway 1 has a given relationship with an input message into the gateway 1. During the conversion of the input message into the output message by the gateway 1, the contents of the source address SA of the input message are moved into the source sub address SA' of the output message. The contents of the destination address DA of the input message are moved into the source address SA of the output message. The contents of the source sub address SA' of the input message are moved into the destination sub address DA' of the output message. The contents of the destination sub address DA' of the input message are moved into the destination address DA of the output message. The contents of the source function means address SSDA of the input message are moved into the source function means address SSDA of the output message. The contents of the destination function means address DSDA of the input message are moved into the destination function means address DSDA of the output message. The contents of the command CMND of the input message are moved into the command CMND of the output message. The codes B1, B2, HD1, and HD20 are free from conversion processes.

Figure 12:
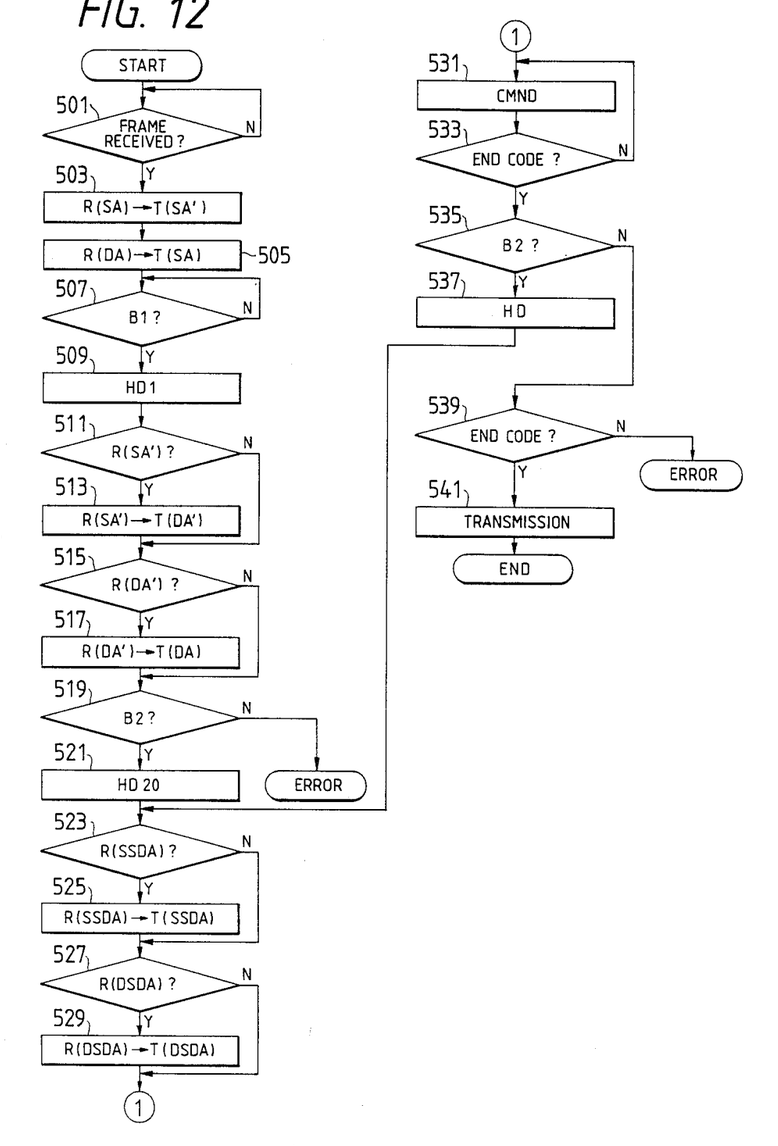
FIG. 12 is a flowchart of a program operating the gateway of FIG. 1.

The gateway 1 operates in accordance with a program stored in the ROM. FIG. 12 is a flowchart of this program. In FIG. 12, the characters R(. . .) represent data of a received or input message, and the characters T(. . .) represent data of a transmitted or output message. In general, the program of FIG. 12 is periodically reiterated.

As shown in FIG. 12, a first step 501 of the program determines whether or not a frame is received. The frame corresponds to a message or the entire codes of a message. When the frame is not received, the program returns to the step 501. When the frame is received, the program advances to a step 503.

The step 503 sets the source sub address SA' of an output message equal to the source address SA of the received message.

A step 505 following the step 503 sets the source address SA of the output message equal to the destination address DA of the received message. After the step 505, the program advances to a step 507.

The step 507 determines whether or not the code B1 is present in the received message. When the code B1 is absent, the program returns to the step 507. When the code B1 is present, the program advances to a step 509.

The step 509 reads the contents of the code HD1. After the step 509, the program advances to a step 511.

The step 507 determines whether or not the source sub address SA' is present in the received message. When the source sub address SA' is present, the program advances to a step 513. When the source sub address SA' is absent, the program jumps to a step 515.

The step 513 sets the destination sub address DA' of the output message equal to the source sub address SA' of the received message. After the step 513, the program advances to the step 515.

The step 515 determines whether or not the destination sub address DA' is present in the received message. When the destination sub address DA' is present, the program advances to a step 517. When the destination sub address DA' is absent, the program jumps to a step 519.

The step 517 sets the destination address DA of the output message equal to the destination sub address DA' of the received message. After the step 517, the program advances to the step 519.

The step 519 determines whether or not the code B2 is present in the received message. When the code B2 is absent, an error is detected and generally the program is restarted. When the code B2 is present, the program advances to a step 521.

The step 521 reads the contents of the code HD20. After the step 521, the program advances to a step 523.

The step 523 determines whether or not the source function means address SSDA is present in the received message. When the source function means address SSDA is present, the program advances to a step 525. When the source function means address SSDA is absent, the program jumps to a step 527.

The step 525 sets the source function means address SSDA of the output message equal to the source function means address SSDA of the received message. After the step 525, the program advances to the step 527.

The step 527 determines whether or not the destination function means address DSDA is present in the received message. When the destination function means address DSDA is present, the program advances to a step 529. When the destination function means address DSDA is absent, the program jumps to a step 531.

The step 529 sets the destination function means address DSDA of the output message equal to the destination function means address DSDA of the received message. After the step 529, the program advances to the step 531.

The step 531 moves the command data CMND from the received message to the output message. After the step 531, the program advances to a step 533.

The step 533 determines whether or not the end code END is present in the received message. When the end code END is absent, the program returns to the step 531. When the end code END is present, the program advances to a step 535.

The step 535 determines whether or not the code B2 is present in the received message. When the code B2 is present, the program advances to the step 523 by way of a step 537 which reads the contents of the code HD. When the code B2 is absent, the program advances to a step 539.

The step 539 determines whether or not the end code END is present in the received message. When the end code END is absent, an error is detected and generally the program is restarted. When the end code END is present, the program advances to a final step 541 of the program.

The step 541 transmits the output message. After the step 541, the current execution cycle of the program ends.

DESCRIPTION OF THE SECOND PREFERRED EMBODIMENT

A second embodiment of this invention is similar to the embodiment of FIGS. 1-12 except for a format of a message and a program operating the gateway 1.

Figure 13:
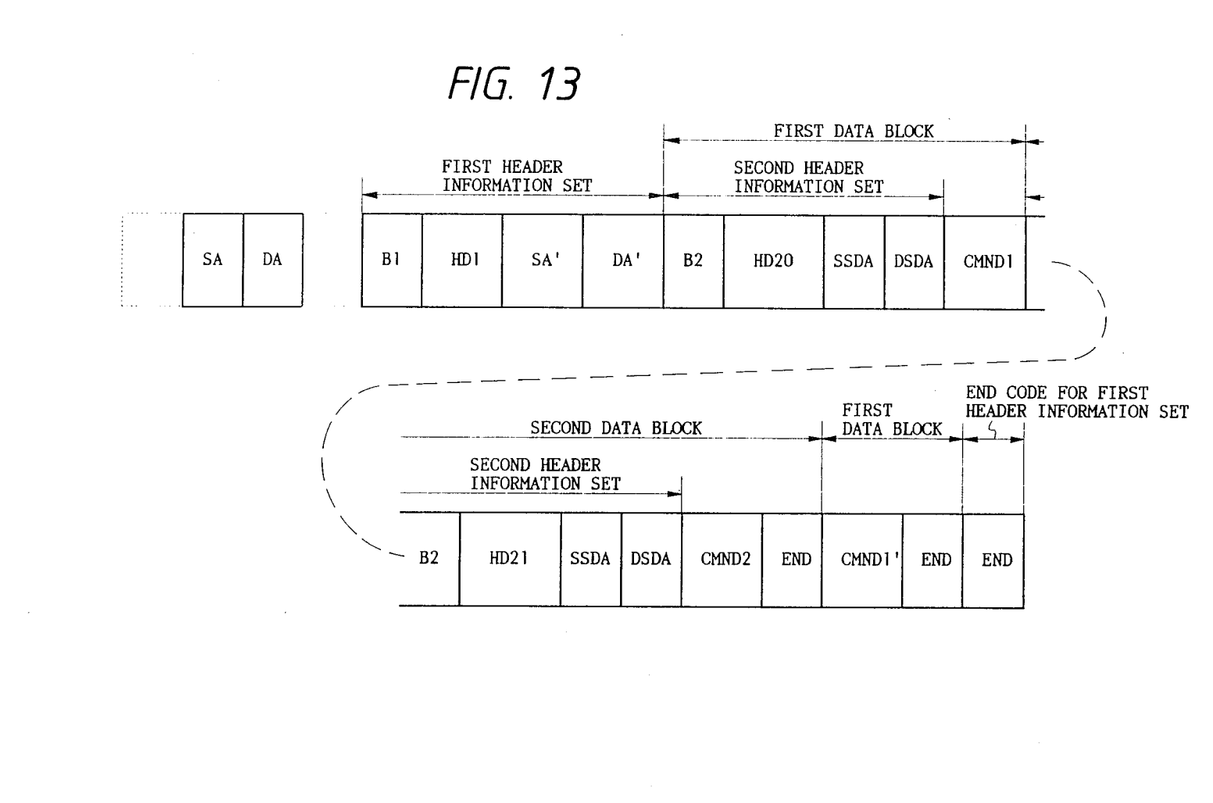
FIG. 13 is a diagram of a format of a message used in a communication system according to a second embodiment of this invention.

As shown in FIG. 13, in the message format of the second embodiment, a second data block is interposed in a first data block in a nesting arrangement. Specifically, a command code of the first data block is separated into two portions CMND1 and CMND1' between which the second data block is placed.

Figure 14:
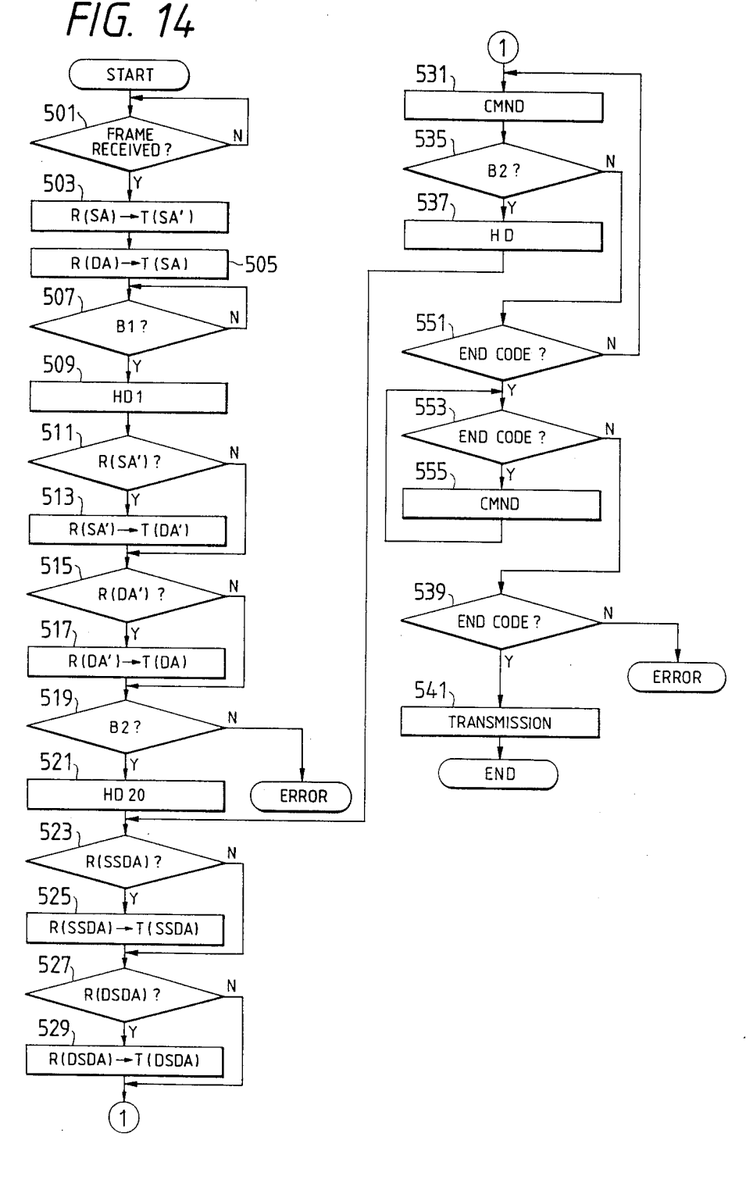
FIG. 14 is a flowchart of a program operating a gateway in the second embodiment of this invention.

As shown in FIG. 14, in the program operating the gateway 1 of the second embodiment, the step 531 moves the command data CMND from the received message to the output message. After the step 531, the program directly advances to the step 535.

Steps 551, 553, and 555 are added between the steps 535 and 539. The step 551 following the step 535 determines whether or not the end code END is present in the received message. When the end code END is absent, the program returns to the step 531. When the end code END is present, the program advances to the step 553. The step 553 also determines whether or not the end code END is present in the received message. When the end code END is absent, the program advances to the step 555. When the end code END is present, the program jumps to the step 539. The step 555 moves the command data CMND' from the received message to the output message. After the step 555, the program returns to the step 553.

DESCRIPTION OF THE THIRD PREFERRED EMBODIMENT

A third embodiment of this invention is similar to the embodiment of FIGS. 1-12 except for a format of a message and a program operating the gateway 1.

Figure 15:
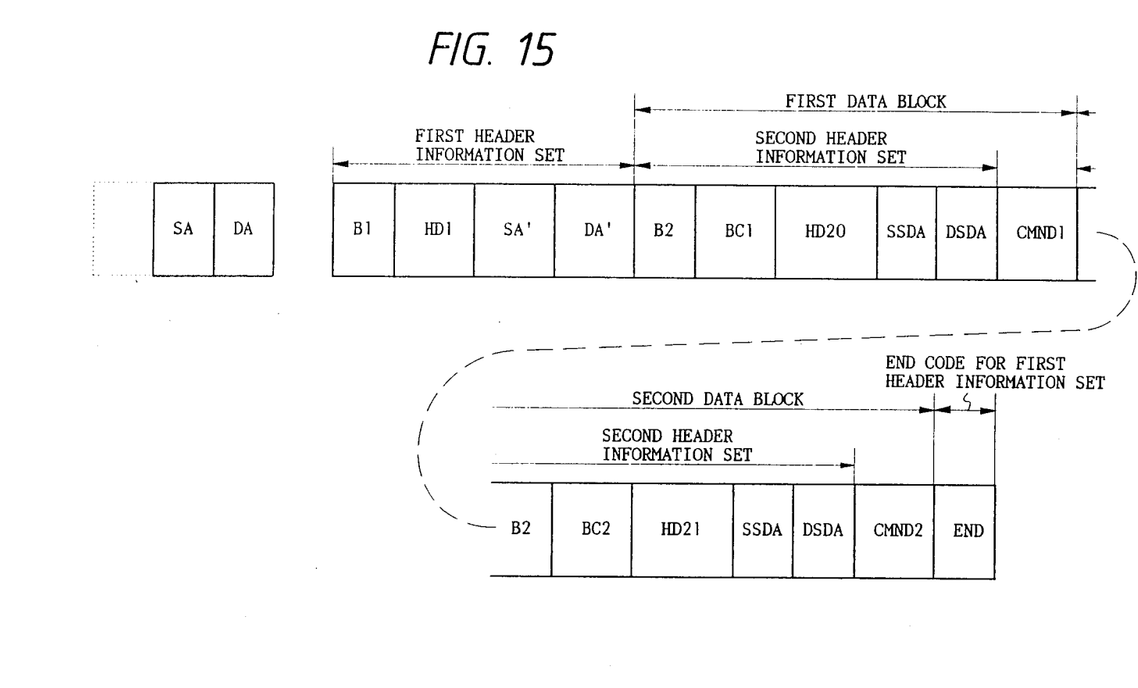
FIG. 15 is a diagram of a format of a message used in a communication system according to a third embodiment of this invention.

As shown in FIG. 15, in the message format of the third embodiment, a count code BC1 is added between the codes B2 and HD20, and also a count code BC2 is added between the codes B2 and HD21. The end codes are omitted from the first and second data blocks. The count code BC1 corresponds to the number of data bytes in the first data block. Specifically, the count code BC1 represents the number of data bytes in the portion of the first data block from the header information code HD20 to the command CMND1. Similarly, the count code BC2 corresponds to the number of data bytes in the second data block. Specifically, the count code BC2 represents the number of data bytes in the portion of the second data block from the header information code HD21 to the command CMND2.

Figure 16:
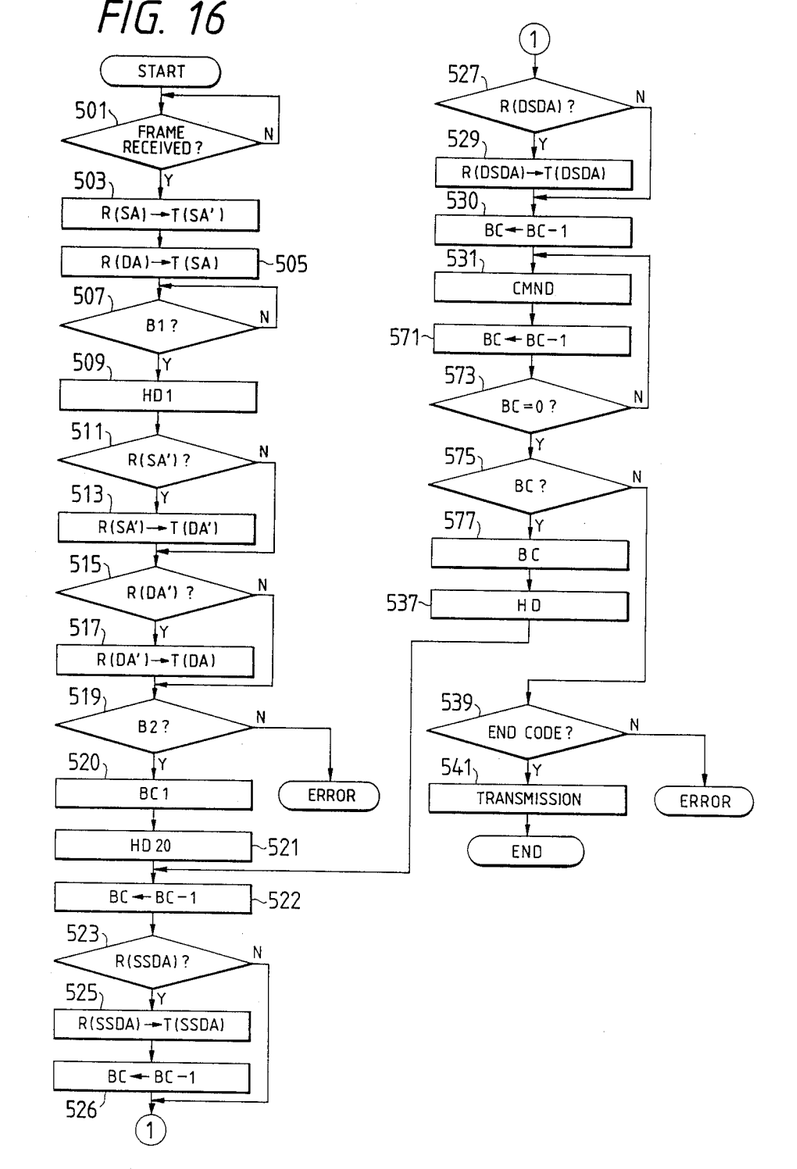
FIG. 16 is a flowchart of a program operating a gateway in the third embodiment of this invention.

As shown in FIG. 16, a step 520 added between the steps 519 and 521 reads the contents of the count code BC1 of the received message. Each of a step 522 added between the steps 521 and 523, a step 526 added between the steps 525 and 527, and a step 530 added between the steps 529 and 531 decrements a value BC representing the number of remaining data bytes. The step 531 is followed by a step 571 which decrements the value BC. A step 573 subsequent to the step 571 determines whether or not the value BC equals "0". When the value BC differs from "0", the program returns to the step 531. When the value BC equals "0", the program advances to a step 575. The step 575 determines whether or not the code BC is present in the received message. When the code BC is absent, the program advances to the step 539. When the code BC is present, the program advances to a step 577. The step 577 reads the contents of the code BC. After the step 577, the program advances to the step 537.

What is claimed is:

1. A communication system comprising:
   a gateway;
   at least two terminal equipments residing in different communication networks respectively and mutually connected via the gateway, wherein one of the terminal equipments transmits a first communication message to the gateway and the gateway generates a second communication message on the basis of the first communication message and transmits the second communication message to the other of the terminal equipments, wherein each of the terminal equipments includes a plurality of sections, and wherein different addresses are alloted to the gateway, the terminal equipments, and the sections of the terminal equipments respectively;

wherein each of the first and second communication messages comprises a source address, a destination address, a first header information set, at least one data block, and an end code; the source address correspondingly to a first one of the gateway and the terminal equipments from which the related message is transmitted, the destination address corresponding to a second one of the gateway and the terminal equipments to which the related message is directed, said second one of the gateway and the terminal equipments being different from said first one of the gateway and the terminal equipments, the first header information set following the source address and the destination address, the data block following the first header information set, the end code following the data block, the end code representing an end of the first header information set;

wherein the first header information set comprises a head code, routing information, and presence/absence information; the presence/absence information following the head code and preceding the routing information, the head code representing a head of the first header information set, the routing information relating to addresses of the terminal equipments to and from which the messages are directed and transmitted, the presence/absence information representing that the routing information is present or absent;

wherein the data block comprises a second header information set, a command, and a second end code; the command being given to one of the sections of the terminal equipment to which the message is directed, the second end code representing an end of the data block;

wherein the second header information set comprises a second head code, second routing information, second presence/absence information, and command information; the second presence/absence information and the command information following the second head code and preceding the second routing information, the second head code representing a head of the second header information set, the second routing information relating to addresses of sections of the terminal equipments to and from which the messages are directed and transmitted, the second presence/absence information representing that the second routing information is present or absent, the command information representing a type of the command.

2. The communication system of claim 1 wherein the gateway comprises:

means for determining the source address of the second message in accordance with the destination address of the first message;

means for determining the destination address of the second message in accordance with the routing information in the first header information set of the first message; and means for determining the routing information in the first header information set of the second message in accordance with the source address of the first message and with the routing information in the first header information set of the first message.

3. A communication system comprising:

a gateway;

at least two terminal equipments residing in different communication networks respectively and mutually connected via the gateway, wherein one of the terminal equipments transmits a first communication message to the gateway and the gateway generates a second communication message on the basis of the first communication message and transmits the second communication message to the other of the terminal equipments, wherein each of the terminal equipments includes a plurality of sections, and wherein different addresses are alloted to the gateway, the terminal equipments, and the sections of the terminal equipments respectively;

wherein each of the first and second communication messages comprises a source address, a destination address, a first header information set, at least two data blocks, and an end code; the source address corresponding to a first one of the gateway and the terminal equipments, the related message being transmitted from said first one of the gateway and the terminal equipments, the destination address corresponding to a second one of the gateway and the terminal equipments, the related message being directed to said second one of the gateway and the terminal equipments, wherein said second one of the gateway and the terminal equipments differs from said first one of the gateway and the terminal equipments, the first header information set following the source address and the destination address, the data block following the first header information set, the end code following the data block, the end code representing an end of the first header information set;

wherein the first header information set comprises a head code, routing information, and presence/absence information; the presence/absence information following the head code and preceding the routing information, the head code representing a head of the first header information set, the routing information relating to addresses of the terminal equipments to and from which the messages are directed and transmitted, the presence/absence information representing that the routing information is present or absent;

wherein the data block comprises a second header information set, a command, and a second end code; the command being given to one of the sections of the terminal equipment to which the message is directed, the second end code representing an end of the data block;

wherein the second header information set comprises a second head code, second routing information, second presence/absence information, and command information; the second presence/absence information and the command information following the second head code and preceding the second routing information, the second head code representing a head of the second header information set, the second routing information relating to addresses of sections of the terminal equipments to and from which the messages are directed and transmitted, the second presence/absence information representing that the second routing information is present or absent, the command information representing a type of the command;

wherein one of the data blocks is interposed in the other of the data blocks in a nesting arrangement.

4. A communication system comprising:

a gateway;

at least two terminal equipments residing in different communication networks respectively and mutually connected via the gateway, wherein one of the terminal equipments transmits a first communication message to the gateway and the gateway generates a second communication message on the basis of the first communication message and transmits the second communication message to the other of the terminal equipments, wherein each of the terminal equipments includes a plurality of sections, and wherein different addresses are alloted to the gateway, the terminal equipments, and the sections of the terminal equipments respectively;

wherein each of the first and second communication messages comprises a source address, a destination address, a first header information set, at least one data block, and an end code; the source address correspondingly to a first one of the gateway and the terminal equipments, the related message being transmitted from said first one of the gateway and the terminal equipments, the destination address corresponding to a second one of the gateway and the terminal equipments, the related message being directed to said second one of the gateway and the terminal equipments, wherein said second one of the gateway and the terminal equipments differs from said first one of the gateway and the terminal equipments, the first header information set following the source address and the destination address, the data block following the first header information set, the end code following the data block, the end code representing an end of the first header information set;

wherein the first header information set comprises a head code, routing information, and presence/absence information; the presence/absence information following the head code and preceding the routing information, the head code representing a head of the first header information set, the routing information relating to addresses of the terminal equipments to and from which the messages are directed and transmitted, the presence/absence information representing that the routing information is present or absent;

wherein the data block comprises a second header information set and a command; the command being given to one of the sections of the terminal equipment to which the message is directed;

wherein the second header information set comprises a second head code, a count code, second routing information, second presence/absence information, and command information; the count code following the second head code, the second presence/absence information and the command information following the count code and preceding the second routing information, the second head code representing a head of the second header information set, the second routing information relating to addresses of sections of the terminal equipments to and from which the messages are directed and transmitted, the second presence/absence information representing that the second routing information is present or absent, the command information representing a type of the command, the count code representing a number of data bytes in the data block.

5. A communication system as recited in claim 1 further comprising an additional communication network including an additional terminal equipment having a plurality of sections, further including an additional gateway thereby to provide communication between said additional terminal equipment in said additional communication network and each of said at least two terminal equipments, wherein said additional terminal equipment transmits an additional communication message to said additional gateway for transmitting a second additional communication message to said gateway or to one of said two terminal equipments.

6. A communication system as recited in claim 3 further comprising an additional communication network including an additional terminal equipment having a plurality of sections, further including an additional gateway thereby to provide communication between said additional terminal equipment in said additional communication network and each of said at least two terminal equipments, wherein said additional terminal equipment transmits an additional communication message to said additional gateway for transmitting a second additional message to said gateway or to one of said two terminal equipments.

7. A communication system as recited in claim 4 further comprising an additional communication network including an additional terminal equipment having a plurality of sections, further including an additional gateway thereby to provide communication between said additional terminal equipment in said additional communication network and each of said at least two terminal equipments, wherein said additional terminal equipment transmits an additional communication message to said additional gateway for transmitting a second additional communication message to said gateway or to one of said two terminal equipments.

* * * * *